No. 897,988. PATENTED SEPT. 8, 1908.
G. A. H. MULLER.
MEANS FOR EXTERMINATING INSECTS AND OTHER VERMIN.
APPLICATION FILED FEB. 10, 1908.
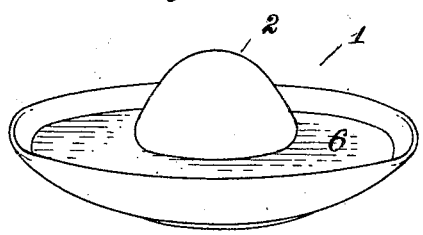
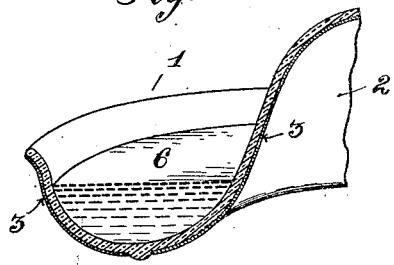
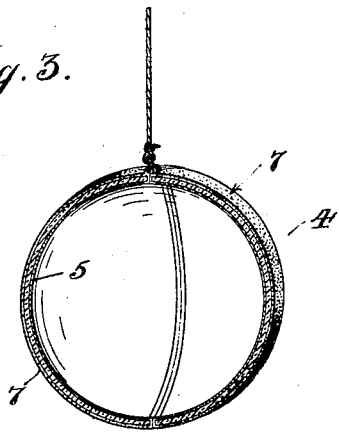
Witnesses. Inventor.

UNITED STATES PATENT OFFICE.

GUSTAVE AUGUSTUS HENRY MULLER, OF MONTREAL, QUEBEC, CANADA.

MEANS FOR EXTERMINATING INSECTS AND OTHER VERMIN.

No. 897,988.      Specification of Letters Patent.      Patented Sept. 8, 1908.

Application filed February 10, 1908. Serial No. 415,206.

*To all whom it may concern:*

Be it known that I, GUSTAVE AUGUSTUS HENRY MULLER, a subject of the King of Great Britain, resident of 166$^A$ Mansfield street, in the city and district of Montreal, in the Province of Quebec, in the Dominion of Canada, have invented certain new and useful Improvements in Means of Exterminating Insects and other Vermin, of which the following is a specification.

The invention relates to insect and vermin exterminators, as described in the present specification and illustrated in the accompanying drawings that form part of the same.

The invention consists essentially of the direct application of a cool luminous substance to a transparent body and the association of a destructive agent with said transparent body and luminous substance.

The objects of the invention are to entice insects and vermin in the still hours of the night-time by means of a brilliant light to their destruction, to thus clear storehouses and cupboards from obnoxious creatures and to lessen the pest, prevalent in warm climates, of flying insects.

In the drawings, Figure 1 is a perspective view of a style of dish showing one form of destructive agent. Fig. 2 is a sectional perspective detail of a portion of the dish illustrated in Fig. 1. Fig. 3 is a sectional perspective view of a glass globe showing another form of destructive agent used.

Like numerals of reference indicate corresponding parts in each figure.

Referring to the drawings, 1 is a glass dish having the central upward projection 2 forming the circular liquid receptacle around said central portion.

3 is a coating of cool luminous substance, preferably a mixture of chemicals which will in the darkness show as a brilliant blue light, while in the day-time it will absorb light.

It is not essential to the invention as to the particular ingredients making up this luminous substance, though it has been proved in practice that the blue light is more efficacious in luring insects and animals to destruction. The said substance may be made with a calcium, barium sulfid or phosphorous base, probably the former, but in coating the surface of the glass with the luminous substance, a prepared luminous paint may be used as the said cool luminous substance is not necessarily of my own mixing.

In Fig. 3, 4 is a globe, preferably made in halves suitably secured together and having the coating 5 of cool luminous substance on the inside of a precisely similar nature to the cool luminous substance described in connection with Figs. 1 and 2.

The destructive agent in Figs. 1 and 2 is shown as a poisonous liquid 6 and contained in the circular receptacle surrounding the upward projection 2, thus when the animals or insects attracted by the brilliancy of the cool luminous substance shining through the transparent body reach the receptacle, they will drink of the poisonous liquid and be destroyed, but it will readily be understood that any other suitable destructive agent may be used in connection with the said glass body or many different forms of glass bodies may be used without departing from the spirit of my invention.

The destructive agent 7 used in connection with the form shown in Fig. 3 is a sticky substance having similar properties to that of a sucrate of potash, that is to say, it will not dry up, also this sticky substance is transparent, consequently the brilliancy of the cool luminous substance inside the glass shines through said glass and through said sticky substance and attracts the insects to the globe.

The globe form of this invention is particularly efficacious for the outdoor use of the invention, as hanging under a veranda or other place it will attract multitudes of the small flying insects and may be readily washed off and again coated with the sticky substance.

What I claim as my invention is:

1. In an insect and vermin exterminator, the combination with a transparent body, of a cool luminous substance applied as a coating on said body, and a destructive agent carried by said transparent body, substantially as described.

2. In an insect and vermin exterminator, in combination, a glass dish forming a bowl-like receptacle having a prominently exposed portion extending above the bowl portion, a cool luminous substance coating said dish, and a destructive agent carried by said bowl portion, substantially as described.

3. In a device of the class described, a glass body suitably formed, a cool luminous substance painted on one side of said glass body and a destructive agent arranged on the other side of said glass body, through which the light from said luminous substance radiates, substantially as described Signed at the city and district of Montreal, in the Province of Quebec, in the Dominion of Canada, this 5th day of February 1908.

GUSTAVE AUGUSTUS HENRY MULLER.

Witnesses:
W. T. CUFFE-QUIN,
HARRY DAVIS.